UNITED STATES PATENT OFFICE.

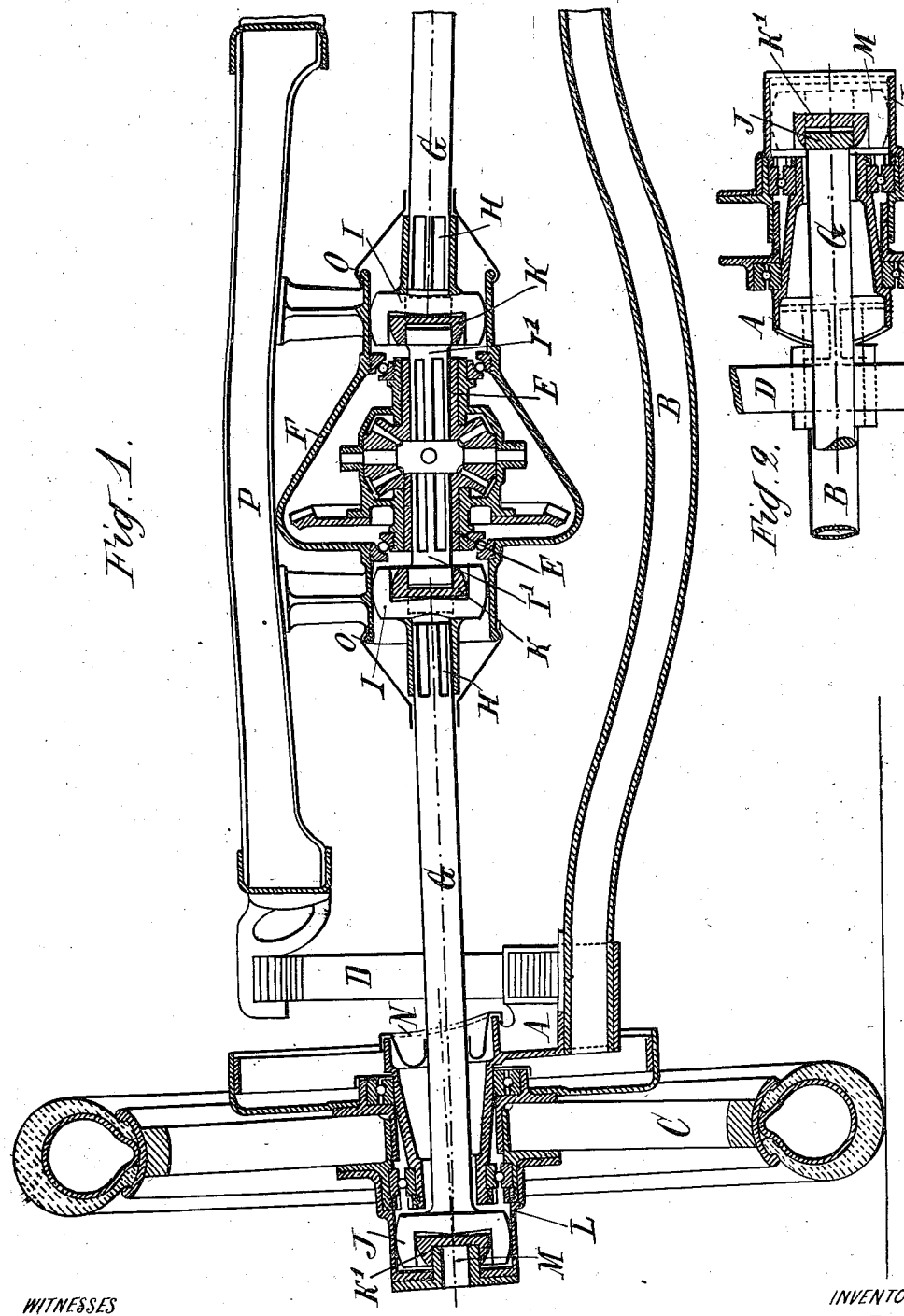

FRANCOIS PILAIN, OF LYON, FRANCE.

SHAFT-DRIVEN AXLE FOR AUTOMOBILE VEHICLES.

975,276.  Specification of Letters Patent.  Patented Nov. 8, 1910.

Application filed January 15, 1907. Serial No. 352,455.

*To all whom it may concern:*

Be it known that I, FRANCOIS PILAIN, a citizen of the French Republic, and residing at 17 Chemin de Monplaisir, à Grange-Rouge, Lyon, in the Department of Rhône, France, engineer, have invented a certain new and useful Shaft-Driven Axle for Automobile Vehicles, of which the following is a full, clear, and exact description, and for which I have applied for Letters Patent in France, dated January 17, 1906.

This invention relates to a system of shaft driven axle for automobile vehicles. This axle comprises a carrier-axle body with hollow barrels allowing the passage of Cardan-shafts coming from the differential which receives the drive from the engine in any convenient manner, and is mounted in a box or casing fixed to the chassis or frame of the vehicle, the shafts entering freely within the barrels and driving outside their central planes the wheels mounted upon the barrels. These shafts are not supported at any point other than their connections by Cardan joints to the differential and to the wheels, and the interior dimensions of the hollow barrels allows the displacement of the Cardan shafts which results from the relative movements of the chassis and of the axle. This arrangement permits of having a rigid axle with dished wheels and of having the differential mounted upon the chassis, the connection between this differential and the wheels being made by shafts which are thus as long as possible and insure efficiency in transmission.

The following description is given with reference to the annexed drawing in which—

Figure 1 is a longitudinal section of the driving mechanism, one wheel and a portion of the axle and chassis. Fig. 2 shows in horizontal section the barrel and the hub of the wheel.

In the drawing A indicates a hollow barrel which forms the extremity of the dropped axle. The whole of these two parts A B forms the bridge or carrying axle; upon the barrel A is mounted the wheel C and to the axle is fixed the ordinary suspension spring D of the vehicle.

The differential E which receives the drive from the engine by means of any suitable transmission, for instance, by means of a Cardan shaft placed in the longitudinal direction of the vehicle and extending to the engine which is arranged in front, is inclosed in a casing or box F fixed to the chassis P of the vehicle. From the differential extend two shafts G G transmitting motion to the wheels. The shaft G at its extremity H on the side of the differential has a feather device engaging in a fork piece I, which with a kernel K and another piece I' similar to I fast with the gear wheel E corresponding with the differential, forms a Cardan or universal joint which permits a certain displacement of the shaft G relatively to the differential. The other extremity of the shaft G ends in a fork J which with a kernel K' and the cap L of the hub form in the hub itself a Cardan or universal joint device between the shaft G and the wheel, the drive of the latter by the shaft G being thus made outside its middle plane; this arrangement permits the shafts G G to be given as great a length as possible, which renders their obliquity very slight and procures good conditions for transmission.

The hollow barrel A is slightly inclined relatively to a horizontal axis passing through the center of the kernels of the Cardan joint K K', this inclination giving a suitable dishing to the wheels. The interior cavity of the barrels is of suitable dimension and shape to allow to the shafts G G the play necessary to their displacement resulting from the flexion of the suspension springs of the vehicle.

N and O are flexible leather shields protecting the parts from dust and humidity.

In order to dismount the parts it suffices to remove the caps from the hubs of the wheel, to remove the Cardan kernels and to withdraw the shafts G G causing the keyed parts to slide in the grooves of the parts I I. This arrangement gives the advantage of direct driving of the wheels while allowing the latter to be dished; the shafts which connect the differential to the wheels are maintained only at their points of connection to the differential and to the wheels without any journaling and by reason of the outside drive of the wheels, the obliquity of these shafts is but small, which affords efficient conditions of transmission.

The invention may of course be carried out with various constructional alterations in accordance with the general arrangement set forth.

Having thus described my invention what I claim as such and desire to secure by Letters Patent is:—

1. In a motor vehicle, the combination of a spring supported body, an axle having a hollow axle end, a wheel journaled upon the hollow axle end, driving mechanism supported by the body, and an intermediate shaft interposed between the driving mechanism and the wheel and extended through the hollow axle end and having universal joint connections at its ends with the driving mechanism and the outer end of the wheel hub respectively.

2. In a motor vehicle, the combination of a spring supported body, an axle having a hollow axle end, a wheel journaled upon the hollow axle end, driving mechanism supported by the body, a universal joint carried by the driving mechanism, a universal joint carried by the outer end of the wheel hub, and an intermediate shaft extended through the hollow axle end and engaging said universal joints.

3. In a motor vehicle, the combination of a spring supported body, an axle having a hollow axle end, a wheel journaled upon the hollow axle end, driving mechanism supported by the body, a universal joint carried by the driving mechanism, a universal joint carried by the outer end of the wheel hub, an intermediate shaft extended through the hollow axle end and engaging said universal joints, and means to compensate for the varying distances between the driving mechanism and the outer end of the wheel hub.

4. In a motor vehicle, the combination of a spring supported body, an axle having a hollow axle end, a wheel journaled upon the hollow axle end, driving mechanism supported by the body, a universal joint carried by the driving mechanism, a universal joint carried by the outer end of the wheel hub, an intermediate shaft extended through the hollow axle end and engaging the universal joints, and a removable cap engaging the outer end of the wheel hub and holding the universal joint in engagement therewith.

In testimony whereof I have signed my name in the presence of the two subscribing witnesses.

FRANCOIS PILAIN.

Witnesses:
 MARIN VACHON,
 THOS. N. BROWNE.